Aug. 30, 1927.

P. J. RUSSELL 1,640,374

LOCK NUT AND ALLIED FASTENING MEANS

Filed June 12, 1926

Inventor
Philip J. Russell
By his attorney
Manuel C. Rosa

Patented Aug. 30, 1927.

1,640,374

UNITED STATES PATENT OFFICE.

PHILIP J. RUSSELL, OF FALL RIVER, MASSACHUSETTS, ASSIGNOR OF FORTY-NINE ONE-HUNDREDTHS TO ERNEST KELLYKOUDAS, OF FALL RIVER, MASSACHUSETTS.

LOCK NUT AND ALLIED FASTENING MEANS.

Application filed June 12, 1926. Serial No. 115,571.

My invention relates to improvements in lock nuts and allied fastening means.

In the mechanical arts, the need often presents itself for a nut which can be installed without danger of working loose. Particularly is this so when the nut is employed where there are moving mechanical parts. In such a case, vibratory forces are usually set up which operate to unloosen by causing the nut to turn in a direction opposite to that wherein it is tightened. Such a loosening of the nut sometimes progresses to the point where the nut falls away whereupon a dismemberment of the machine might take place with injury both to the machine and the operator. In any event the loosening itself is a disadvantageous drawback to the nut now in use, since the efficiency of the parts so held is accordingly reduced through the lost motion or play which developes.

Attempts have been made to offset this defect in the conventional nut and many suggestions have been made but none has gone into any appreciable use. In developing my lock nut, I have been guided by the desire for simplicity, that is the maximum of gripping ability with the minimum of parts. A nut incorporated with my invention is not increased in size. Furthermore, the locking means is so disposed that it is not open to view when the nut is in place.

An object of my invention is to produce a simple and effective lock nut which can be easily installed and secured against loosening.

A further object of my invention is to produce a lock nut having a locking means therein, housed in a seat cut in the under face of the nut whereby the size of the nut is not altered.

A still further object of my invention is to produce a lock nut having a countersunk unthreaded region at the end of the bore nearer the underface of the nut, so that the thread of the bolt which has been dented by the locking means may not interfere with the removal of the nut.

A still further object of my invention is to produce a lock nut having a locking means controllable from the outer or top face of the nut, the locking means being housed in a seat of irregular contour cut in the underface of the nut and of such design that the securing means is held against slipping.

Referring to the drawing.

Similar characters refer to similar parts throughout the several views.

Figure 1:
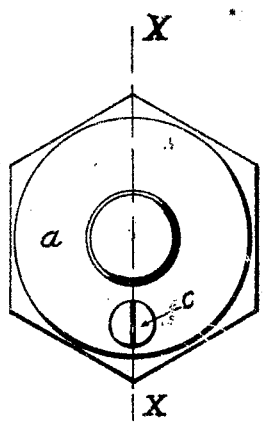
Fig. 1 is a plan view of a nut equipped with my improved locking means showing the slitted head of the rivet member to which the locking means is attached.

In the drawings, $a$ designates a nut of the conventional type. As shown, the nut is hexagonal, however, the shape of the nut is immaterial, my invention being applicable to all nuts regardless of design. Towards one side of the nut, a hole $b$ is bored thru from the top surface to the bottom surface, leaving a vertical hole substantially parallel to the sides of the nut. A rivet member $c$ is disposed in said hole and extends throughout the depth of the nut. The outer end of said rivet member is enlarged and a slit $d$ is made therein for the reception of an edged tool such as a screw driver, for a purpose to be stated hereinafter.

Figure 2:
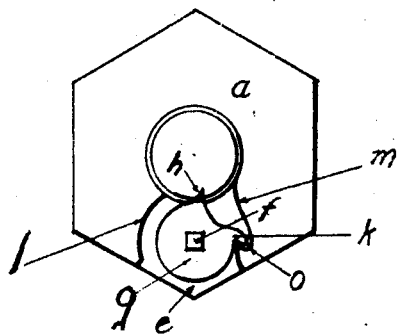
Fig. 2 is a view of the undersurface of the nut showing the undercut portion and the pawl.
Figure 3:
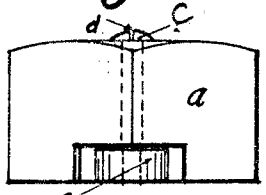
Fig. 3 is a side elevational view of the nut showing the locking means in place on the nut.
Figure 4:
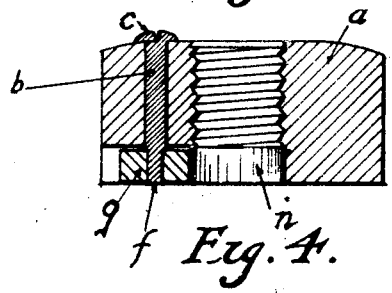
Fig. 4 is a cross-sectional view taken along lines X—X of Fig. 1.
Figure 5:
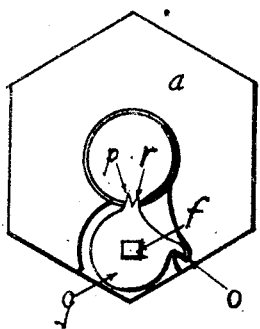
Fig. 5 is a view of the undersurface of a nut showing a modification of the pawl member.

The underside of the nut is cut away in the region of the hole $b$ as shown in Figs. 2 and 5, to form a seat for the pawl. One side of the seat is concavely arcuate while the other side is irregular and presents a notch for the purpose of anchoring the pawl against movement that might loosen or disengage the nut.

The lower end of the rivet member is reduced to form a spindle $f$ to which the pawl $g$ is attached for positive movement. It will be seen that the pawl may be rotated by inserting an edged tool in the slit $d$ of the rivet member in the same way as one manipulates the conventional screw of commerce.

The pawl $g$ is a member of substantially circular contour preferably made of tempered steel and as shown in Fig. 2, has two teeth, $h$ and $k$, the gripping and anchoring teeth, respectively, disposed at substantially a right angle to each other. The arcuate side $l$ of the notch is disposed at such a distance from the spindle $f$ that a clearance for the tooth $h$ is afforded whereby the pawl may be turned freely to the right (looking down from top) without striking the tooth $h$ against the side $l$. The side $m$ of the undercut seat is convexly curved from a point near the bore $n$ to a point adjacent the perimeter of the nut at which point it turns inwardly and then outwardly to the outside of the nut whereby a notch $o$ is formed which receives the anchoring tooth $k$ and holds it against further movement. It will be seen that the tooth $k$ is free to move inwardly but is arrested in its outward movement by the notch $o$.

Another distinctive feature of my improved lock nut is the cutaway portion $n$. The portion of the threaded bore is cut away to a depth equal to and coextensive with the depth of the undercut seat $e$. The threads of the bore in this region are cut away and the bore left smooth throughout its circular extent. The cutting should be carried to a depth which leaves the smooth wall free of the threads on the bolt or similar threaded member to which the nut is affixed. In the course of its use, the threads on the male member become dented and lose their wedge surfaces due to the gripping of the tooth $h$ which would render difficult the removal of the nut were the bore of the nut threaded throughout. By providing the clearance at $n$ the removal is unobstructed.

The use and operation of the improved lock nut is as follows: The pawl is first adjusted so that the gripping and anchoring teeth are adjacent the points where the sides $l$ and $m$ merge into the bore. In other words, the teeth are so disposed that they do not interfere with the installation of the nut.

The nut is then screwed on up to the desired position which generally is that position where the structure held is firmly fastened. At this stage, the rivet or shaft member is operated by an edged tool acting through the slit in the head position and is given a slight turn until the gripping tooth is in the position shown in Fig. 2 and the anchoring tooth engages the notch. In this position the gripping tooth bites into the thread on the male member and in conjunction with the anchoring tooth, resists any reverse rotation of the nut. The nut is locked for all purposes and can not automatically become loose, since it has been screwed on as far as it can travel and as for reverse movement, the anchoring tooth abutting the notched projection holds the gripping tooth against movement, the latter tooth in turn biting into and holding fast the threaded male or bolt member.

Should it be desired to remove the nut, this may be done by turning the pawl through the rivet or shaft member back into the position it was in before insertion on the threaded bolt. It is in the removal step that the clearance $n$ plays a part, in that the dented threads do not interfere therewith, as would be the case if the bore were threaded throughout its extent. It will be appreciated that my improved lock nut is adapted for secure locking against automatic slackening, and yet may be easily removed by a manual operation.

In the modification shown in Fig. 5 the gripping tooth is shown as comprising two dents $p$, $r$, one shorter than the other, that is the one $r$ nearer the anchoring tooth is shorter. I have found that this form gives very good results and provides a better gripping member, inasmuch as there are two gripping points. However, the nature or number of the gripping teeth may be varied without departing from the spirit of my invention.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure which utilize the principle of my invention and fall within the purview of my invention and are within the spirit and scope of the following claims:

What I claim as new is:

1. A lock nut comprising in combination, a nut having a threaded bore, one of the surfaces of said nut having a seat portion cut out therein, said seat portion being substantially aligned with said threaded bore, the threads of the bore of said nut being cut away a distance equal to the depth of the seat portion, one of the sides of said seat portion having a substantially V-shaped notch therein, a pawl member disposed in said seat portion, tooth means on said pawl member to grip the threads of the member to which said nut is applied and a second tooth means on said pawl member for coacting with said notch to prevent reverse rotation of said nut when in place.

2. A locknut comprising in combination, a nut, the underface of said nut having a seat portion cut out therein, said seat portion extending from the outside to the bore of said nut, locking means mounted within said set portion, the threads of the bore of said nut being cut away for a distance equal to the depth of the seat portion.

3. A lock nut comprising in combination, a nut, said nut having a hole therein substantially parallel to the threaded bore of said nut, a slitted head rivet member rotatably mounted in said hole, the underface of said nut having a seat portion cut out in the region of said hole, one of the sides of said seat portion having a substantially V-shaped notch therein, the threads of the bore of said nut being cut away a distance equal to the depth of the seat portion, a pawl member disposed in said seat portion, locking means on said pawl member, said locking means comprising teeth or dents on the periphery of said pawl, one of said teeth being adapted to bite the male member to which said nut is applied and another of said teeth which is substantially right angularly disposed to the first mentioned tooth, being adapted to engage said notched portion to prevent reverse movement.

4. A lock nut of the character described, comprising a nut, one of the surfaces of said nut having a seat portion cut out therein, said seat portion extending from the perimeter to the bore of said nut, one of the sides of said seat portion having a notch therein, locking means mounted in said seat portion comprising a rotatable member, said rotatable means having means for gripping the male member to which said nut is applied, and additional means cooperating with said notch in the side of the seat portion for anchoring the gripping means against reverse movement, the threads of the bore of said nut being cut away a distance equal to and co-extensive with the depth of said seat portion.

Signed at Fall River in the county of Bristol, State of Massachusetts, this fourth day of June, 1926.

PHILIP J. RUSSELL.